US012649312B2

(12) United States Patent
Suzuki

(10) Patent No.: US 12,649,312 B2
(45) Date of Patent: Jun. 9, 2026

(54) LIQUID DISCHARGE APPARATUS

(71) Applicant: Hideaki Suzuki, Kanagawa (JP)

(72) Inventor: Hideaki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 139 days.

(21) Appl. No.: 18/606,202

(22) Filed: Mar. 15, 2024

(65) Prior Publication Data

US 2024/0326448 A1 Oct. 3, 2024

(30) Foreign Application Priority Data

Mar. 29, 2023 (JP) ................................ 2023-053193

(51) Int. Cl.
*B41J 2/17* (2006.01)
*B41J 29/17* (2006.01)

(52) U.S. Cl.
CPC ........... *B41J 2/1714* (2013.01); *B41J 2/1721* (2013.01); *B41J 29/17* (2013.01); *B41J 2/1742* (2024.05); *B41P 2235/21* (2013.01)

(58) Field of Classification Search
None
See application file for complete search history.

(56) References Cited

U.S. PATENT DOCUMENTS

2016/0089887 A1* 3/2016 Shindo ................ B41J 2/16508 347/35
2019/0291472 A1* 9/2019 Nakano ................. B41J 2/1714

FOREIGN PATENT DOCUMENTS

JP 2013-063390 A 4/2013
JP 2013-166385 A 8/2013
JP 2014-065273 A 4/2014
JP 2019-048441 A 3/2019
JP 2021176693 A * 11/2021
WO WO-2018235378 A1 * 12/2018 ............ B41J 2/185

OTHER PUBLICATIONS

Sato, Machine TranslationofJP-2021176693-A, 2021 (Year: 2021).*
Arima, Machine TranslationofWO-2018235378-A1, 2018 (Year: 2018).*

* cited by examiner

*Primary Examiner* — Scott A Richmond
(74) *Attorney, Agent, or Firm* — Harness, Dickey & Pierce, P.L.C.

(57) ABSTRACT

A liquid discharge apparatus includes a liquid discharge head, a mist collector, an electrode, and a cleaning liquid applier. The liquid discharge head discharges a liquid. The mist collector includes a mist collection portion and a connection portion. The mist collection portion is formed of a conductive material to collect a mist of the liquid on a surface of the mist collection portion. The connection portion is disposed at each end of the mist collection portion. The electrode is connected to the connection portion to apply a voltage to the mist collection portion through the connection portion. The cleaning liquid applier applies a cleaning liquid to the surface of the mist collection portion to remove the mist from the surface of the mist collection portion.

8 Claims, 4 Drawing Sheets

LIQUID DISCHARGE APPARATUS

CROSS-REFERENCE TO RELATED APPLICATION

This patent application is based on and claims priority pursuant to 35 U.S.C. § 119 (a) to Japanese Patent Application No. 2023-053193, filed on Mar. 29, 2023, in the Japan Patent Office, the entire disclosure of which is hereby incorporated by reference herein.

BACKGROUND

Technical Field

Embodiments of the present disclosure relate to a liquid discharge apparatus.

Related Art

In a liquid discharge apparatus having a liquid discharge head, when ink as a liquid is discharged from the liquid discharge head, a mist of the ink (i.e., ink mist) smaller than a droplet of the ink is scattered in the apparatus. In the related art, a liquid discharge apparatus includes a collection device that collects a mist of the ink.

SUMMARY

Embodiments of the present disclosure describe an improved liquid discharge apparatus that includes a liquid discharge head, a mist collector, an electrode, and a cleaning liquid applier. The liquid discharge head discharges a liquid. The mist collector includes a mist collection portion and a connection portion. The mist collection portion is formed of a conductive material to collect a mist of the liquid on a surface of the mist collection portion. The connection portion is disposed at each end of the mist collection portion. The electrode is connected to the connection portion to apply a voltage to the mist collection portion through the connection portion. The cleaning liquid applier applies a cleaning liquid to the surface of the mist collection portion to remove the mist from the surface of the mist collection portion.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
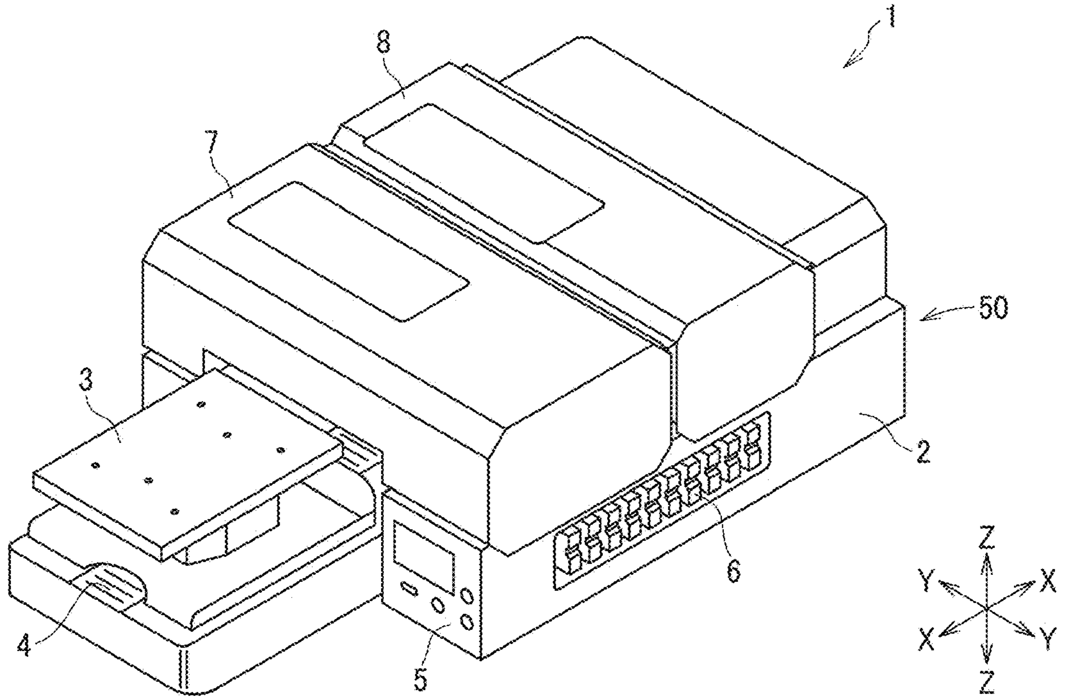
FIG. 1 is a perspective view of a liquid discharge apparatus according to an embodiment of the present disclosure, with covers closed.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the drawings, like reference signs denote like elements, and overlapping description may be simplified or omitted as appropriate. In the following description, a liquid discharge apparatus according to an embodiment of the present disclosure discharges a liquid, such as ink and a pretreatment liquid, onto a recording medium such as a cloth.

Figure 2:
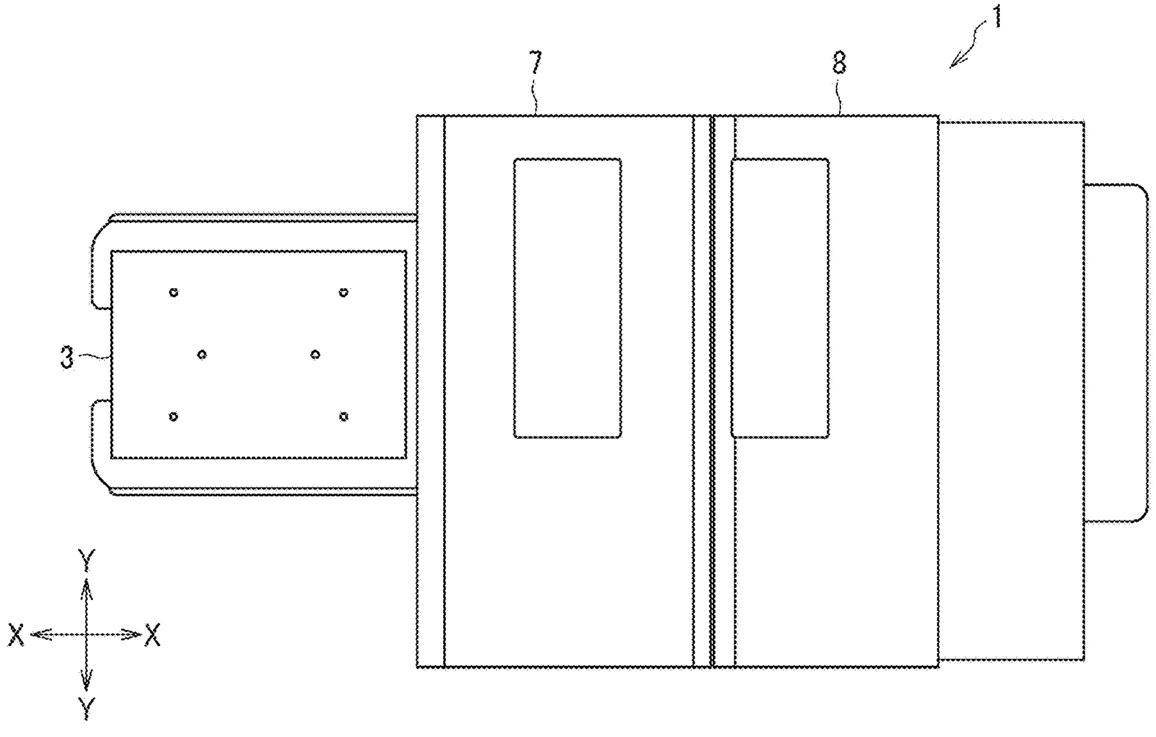
FIG. 2 is a plan view of the liquid discharge apparatus of FIG. 1.
Figure 3:
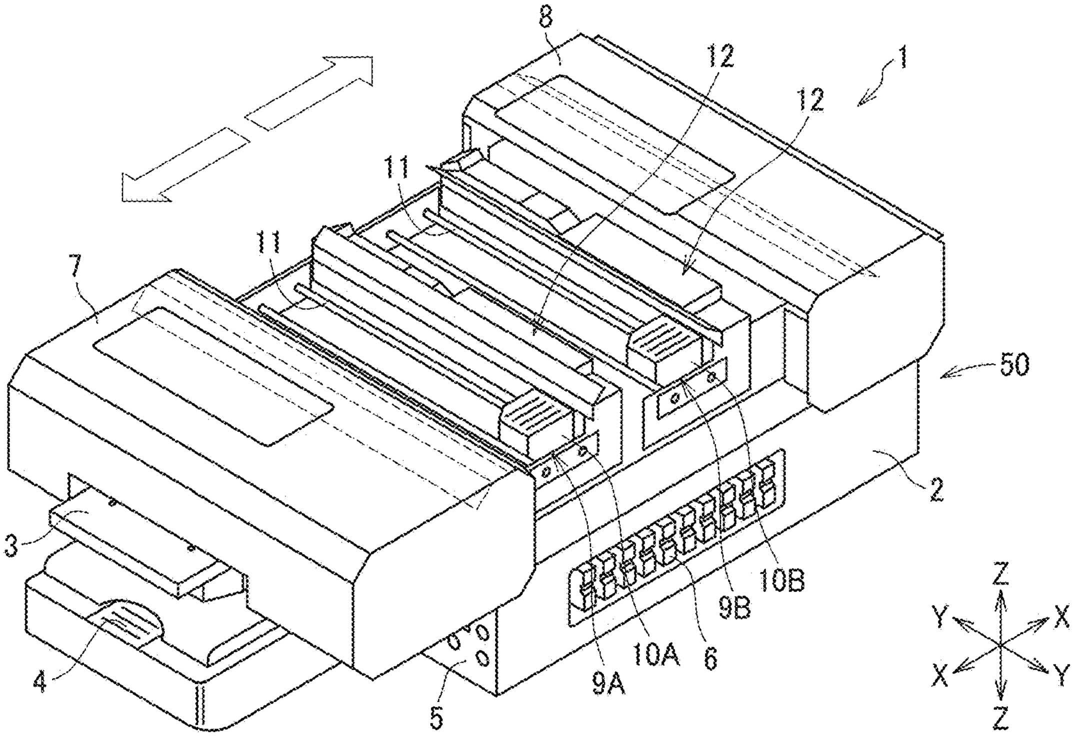
FIG. 3 is a perspective view of the liquid discharge apparatus of FIG. 1 with the covers open.
Figure 4:
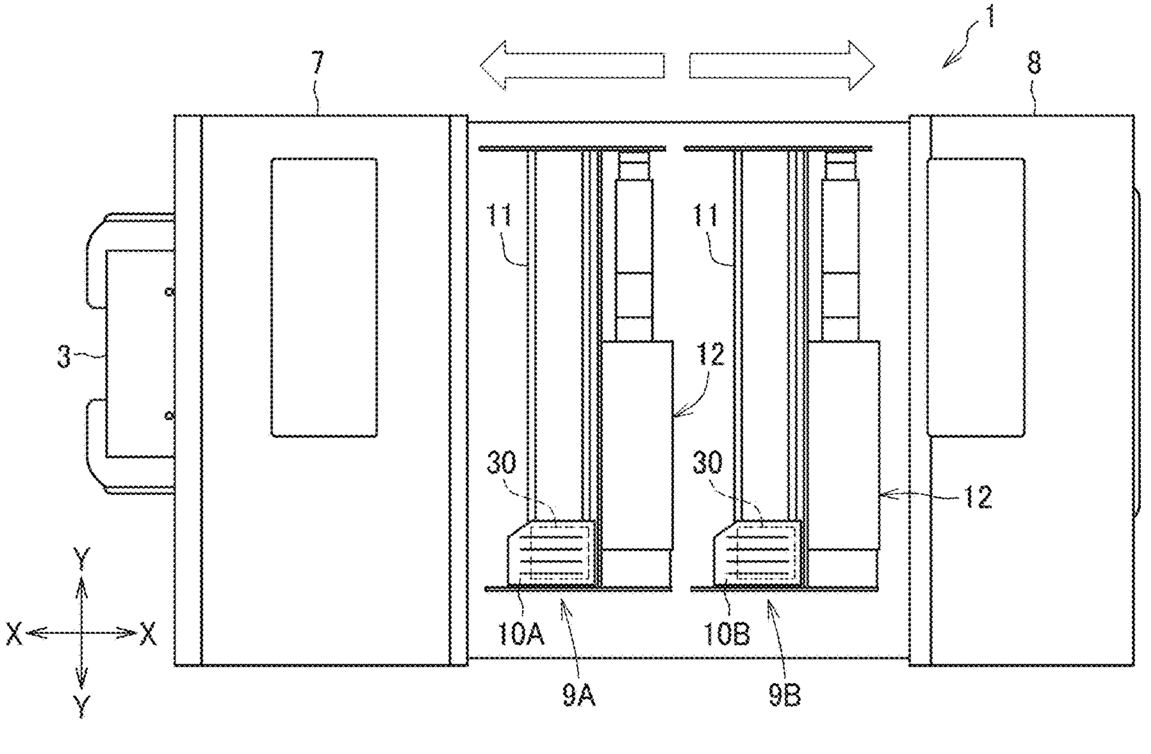
FIG. 4 is a plan view of the liquid discharge apparatus of FIG. 3.

FIG. 1 is a perspective view of a liquid discharge apparatus 1 according to an embodiment of the present disclosure, with covers closed, and FIG. 2 is a plan view thereof. FIG. 3 is a perspective view of the liquid discharge apparatus 1 of FIG. 1, according to the present embodiment, with the covers open, and FIG. 4 is a plan view thereof. Directions X in FIG. 1 are the front-rear direction, sub-scanning direction, and recording-medium conveyance direction of the liquid discharge apparatus 1. Directions Y in FIG. 1 are the transverse direction and main scanning direction of the liquid discharge apparatus 1. Directions Z in FIG. 1 are the vertical directions of the liquid discharge apparatus 1. The directions X and the directions Y are parallel to a surface, onto which a liquid is discharged, of a recording medium on a stage 3, but may have some error. The directions X, Y, and Z are orthogonal to each other.

As illustrated in FIGS. 1 and 2, the liquid discharge apparatus 1 includes the stage 3 in front of a housing 2. The stage 3 is mounted on a guide rail 4. The guide rail 4 extends in the directions X. A control panel 5 is disposed on the front face of the housing 2. An ink cartridge 6 is detachably attached to a side face of the housing 2. A front cover 7 and a rear cover 8 as covers are disposed over the housing 2.

The stage 3 has a flat upper face on which the recording medium is placed. The upper face of the stage 3 is parallel to the directions X and the directions Y. The stage 3 moves on the guide rail 4 to reciprocate in both the directions X. The stage 3 is movable up and down in the directions Z. Thus, the height of the recording medium placed on the stage 3 is adjustable.

The front cover 7 and the rear cover 8 are movable in both the directions X. In FIG. 1, the front cover 7 has been moved backward and the rear cover 8 has been moved forward to close the front cover 7 and the rear cover 8 (i.e., a closed position). On the other hand, in FIG. 3, the front cover 7 is moved forward and the rear cover 8 is moved backward to open the front cover 7 and the rear cover 8 (i.e., an open position). As described above, the front cover 7 and the rear cover 8 are slidably opened and closed. As a result, an occupied space of the liquid discharge apparatus 1 including an opening and closing space of each of the front cover 7 and the rear cover 8 can be reduced as compared with a configuration in which a front cover and a rear cover are opened and closed in the vertical directions. The front cover 7 and the rear cover 8 have openings at both ends in the front-rear direction. When the front cover 7 and the rear cover 8 are closed, the front cover 7 and the rear cover 8 are continuously arranged in the front-rear direction.

As illustrated in FIGS. 3 and 4, an apparatus body 50 of the liquid discharge apparatus 1 includes, for example, the housing 2 and liquid discharge units 9A and 9B mounted on the housing 2. In the present embodiment, specifically, the apparatus body 50 is a portion of the liquid discharge apparatus 1 other than the front cover 7 and the rear cover 8. The front cover 7 and the rear cover 8 are slidable in the directions X relative to the apparatus body 50.

The front cover 7 and the rear cover 8 are opened to expose the liquid discharge units 9A and 9B to the outside of the liquid discharge apparatus 1. When the liquid discharge units 9A and 9B are exposed to the outside, an operator can clean a maintenance unit 30, a liquid discharge head, and the surroundings thereof, or can replace carriages 10A and 10B. The front cover 7 and the rear cover 8 are closed during image formation. As a result, the liquid discharge units 9A and 9B are covered by the front cover 7 and the rear cover 8 to block access to operation units such as the carriages 10A and 10B of the liquid discharge units 9A and 9B from the outside. The liquid discharge units 9A and 9B are disposed in the closed space in the front cover 7 or the rear cover 8. Accordingly, a mist of ink (liquid) is prevented from scattering to environs outside the liquid discharge apparatus 1 while the liquid discharge head discharges the ink to the recording medium (i.e., during liquid discharge operation). Further, the liquid discharge units 9A and 9B may include a fan to circulate an airflow in the front cover 7 or the rear cover 8 to collect the generated a mist of the ink (i.e., ink mist) in the front cover 7 or the rear cover 8.

The liquid discharge apparatus 1 according to the present embodiment includes the two liquid discharge units 9A and 9B arranged side by side in the directions X. The liquid discharge unit 9A discharges color ink and white ink. The liquid discharge unit 9B discharges a pretreatment liquid. The liquid discharged by each of the liquid discharge units 9A and 9B is not limited to the above example, and any liquid of the color ink, the white ink, and the pretreatment liquid may be discharged by each of the liquid discharge units 9A and 9B. In particular, when the recording medium is a fabric, the pretreatment liquid is preferably applied to the recording medium before the image formation using the ink. In other words, one of the liquid discharge units 9A and 9B preferably discharges the pretreatment liquid.

Since the liquid discharge units 9A and 9B have similar configurations, the liquid discharge unit 9A is described below. The liquid discharge unit 9A includes the carriage 10A, a guide rod 11, an electrical component unit 12 including, for example, a board and an electrical component cover, and the maintenance unit 30. The liquid discharge units 9A and 9B and the carriages 10A and 10B may be referred to simply as a liquid discharge unit 9 and a carriage 10, respectively, unless distinguished.

The guide rod 11 extends in the main scanning direction. The carriage 10 is movable in the main scanning direction along the guide rod 11. The carriage 10 includes multiple liquid discharge heads 20 (see FIG. 6). The maintenance unit 30 is disposed at a position facing the guide rod 11 outside a liquid discharge region on one side in the transverse direction (directions Y).

The maintenance unit 30 includes, for example, a wiping member that cleans a nozzle face of the liquid discharge head 20 and a suction mechanism that sucks the nozzle face. The wiping member may be a wiper made of, for example, rubber, or a web made of, for example, nonwoven fabric.

The process of forming an image on the recording medium by the liquid discharge head is described below.

The recording medium is placed on the stage 3 and conveyed along the guide rail 4. The recording medium is conveyed to the rear side of the liquid discharge apparatus 1, and the pretreatment liquid is applied to the recording medium by the liquid discharge unit 9B. Specifically, while the carriage 10B moves in the main scanning direction along the guide rod 11, the liquid discharge unit 9B discharges the pretreatment liquid from nozzles of the liquid discharge head 20 to apply the pretreatment liquid to the entire width of the recording medium in the main scanning direction. The application of the pretreatment liquid is repeated at multiple positions in the sub-scanning direction. As a result, the pretreatment liquid is applied to the entire recording medium. After that, the stage 3 moves forward, and the liquid discharge unit 9A discharges the color ink of multiple colors onto the recording medium using a method similar to that of the liquid discharge unit 9B. When white color is printed on the recording medium, for example, the liquid discharge unit 9A discharges the white ink onto the recording medium, the stage 3 moves to the rear side of the liquid discharge unit 9A again, and the liquid discharge unit 9A discharges the color ink onto the recording medium. Thus, an image is formed on the recording medium.

Figure 5:
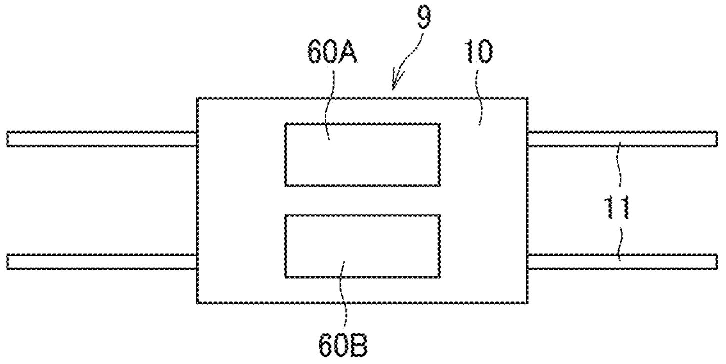
FIG. 5 is a plan view of two liquid discharge head units mounted on one carriage, according to an embodiment of the present disclosure.

As illustrated in FIG. 5, the carriage 10 may include multiple liquid discharge head units 60 (60A on the rear side and 60B on the front side of the apparatus) each including multiple liquid discharge heads 20. In this case, for example, the pretreatment liquid is discharged by the liquid discharge head unit 60A, and the white or the color ink is discharged by the liquid discharge head unit 60B. The liquid discharge head unit 60 may include a single liquid discharge head 20.

As described above, in the liquid discharge apparatus having the liquid discharge head that discharges a liquid (ink), a part of the discharged liquid may turn into a mist, and the mist may be scattered in the liquid discharge apparatus. A configuration of a mist collector that collects the ink mist (i.e., the mist of the ink) is described below with reference to FIGS. 6 to 10.

Figure 6:
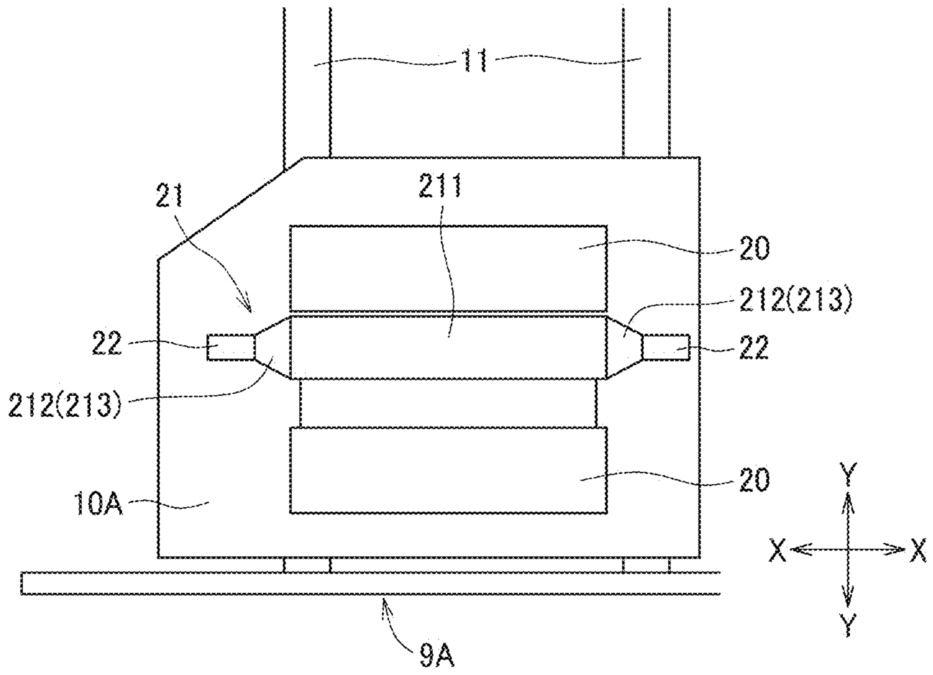
FIG. 6 is a plan view of a mist collector and the surroundings thereof, according to an embodiment of the present disclosure.

FIG. 6 is a plan view of the carriage 10A of FIG. 4 from which an upper lid is removed.

Figure 7:
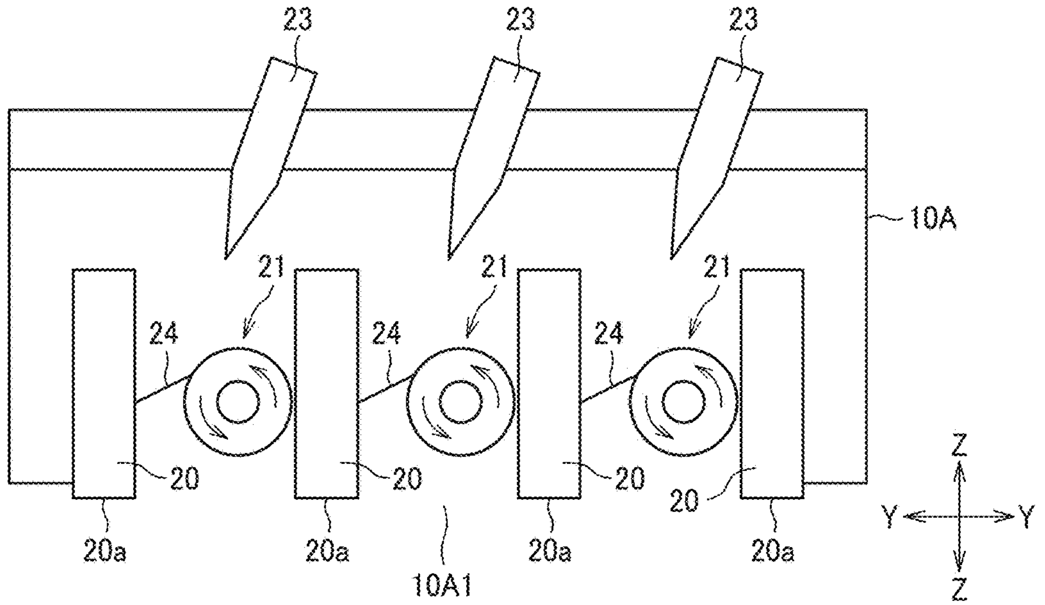
FIG. 7 is a front view of a carriage including multiple mist collectors according to an embodiment of the present disclosure.

In FIG. 6, a mist collector 21 is disposed between the two liquid discharge heads 20. The mist collector 21 is also disposed in the carriage 10B, but may be disposed in either one of the carriages 10A and 10B. In FIG. 6, the carriage 10A includes, for example, two liquid discharge heads 20, but the number of liquid discharge heads 20 may be one or three or more. For example, as illustrated in FIG. 7, when four liquid discharge heads 20 corresponding to colors of cyan (C), magenta (M), yellow (Y), and black (K) are arranged in parallel in the directions Y in the carriage 10A, three mist collector 21 in total are respectively disposed between the adjacent liquid discharge heads 20 in the carriage 10A. An opening 10A1 is formed at the bottom of the carriage 10A, and a nozzle face 20*a* of each liquid discharge head 20 is exposed to the outside of the carriage 10A through the opening 10A1.

As illustrated in FIG. 6, the mist collector 21 includes a mist collection portion 211 and a connection portion 212. The mist collection portion 211 is formed of a conductive material. In the present embodiment, the mist collection portion is disposed over the range where the liquid discharge head 20 is disposed in the directions X. The connection portion 212 is formed of a conductive material. The connection portions 212 are disposed at both ends of the mist collector 21, respectively. The connection portions 212 are connected to electrodes 22. The connection portion 212 is covered with a nonconductor 213.

Figure 8:
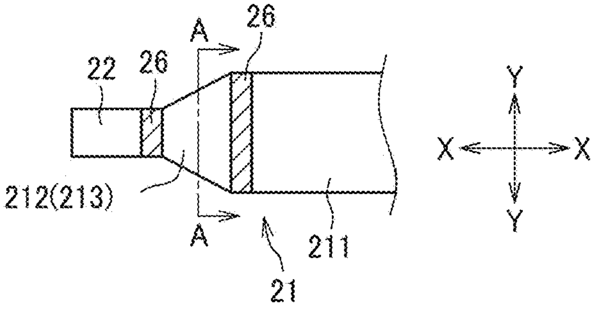
FIG. 8 is a diagram illustrating a connection portion of a mist collector and the surroundings thereof, according to an embodiment of the present disclosure.
Figure 9:
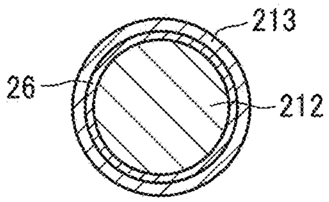
FIG. 9 is a cross-sectional view of the mist collector taken along line A-A in FIG. 8.

FIG. 8 is an enlarged view of the connection portion 212 and the surroundings thereof, and FIG. 9 is a cross-sectional view of the connection portion 212 taken along line A-A of FIG. 8.

As illustrated in FIG. 9, in the present embodiment, the entire circumference of the connection portion 212 is covered with the nonconductor 213. An adhesive 26 is interposed between the connection portion 212 and the nonconductor 213 to bond the nonconductor 213 to the connection portion 212. As illustrated in FIG. 8, the adhesive 26 is also disposed at both ends of the connection portion 212 in the directions X, i.e., in the gap between the nonconductor 213 and the mist collection portion 211 and the gap between the nonconductor 213 and the electrode 22. Thus, the adhesive 26 entirely covers the connection portion 212 without a gap so that the connection portion 122 is not exposed to the outside. In the present embodiment, the adhesive 26 is made of resin, but is not limited thereto. The nonconductor 213 is formed of, for example, rubber, polyethylene, or polyvinyl chloride, but is not limited thereto.

A voltage is applied to the mist collection portion 211 by the electrodes 22 disposed at both ends of the mist collector 21. Due to such a configuration, the mist collection portion 211 can collect the charged mist near the mist collection portion 211 by the electrostatic action.

Figure 10:
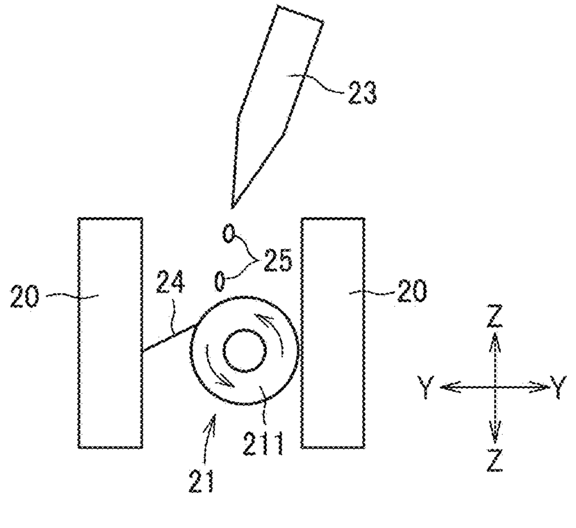
FIG. 10 is a front view of a mist collector and the surroundings thereof, according to an embodiment of the present disclosure.

As illustrated in FIG. 10, the mist collection portion 211 is rotatable in a direction along the surface of the paper on which FIG. 10 is drawn, with the directions X, as a virtual axis, perpendicular to the surface of the paper on which FIG. 10 is drawn. A cleaning liquid nozzle 23 as a cleaning liquid applier is disposed above the mist collection portion 211, and supplies a cleaning liquid 25 to the surface of the mist collection portion 211.

A blade 24 as a cleaner contacts the surface of the mist collection portion 211. The cleaning liquid 25 is supplied to the surface of the mist collection portion 102 while the mist collection portion 211 rotates to wash the mist on the surface of the mist collection portion 211. The blade 24 contacting the surface of the mist collection portion 211 can scrape off (i.e., remove) the mist and the cleaning liquid on the surface of the mist collection portion 211. The mist is collected by the lower side in FIG. 10 of the mist collection portion 211, which is the nozzle face side of the liquid discharge head. In this way, when the mist collection portion 211 rotates, the mist is collected by the mist collection portion 211, washed by the cleaning liquid 25, and scraped off (removed) by the blade 24 in this order along the circumferential surface of the mist collection portion 211. Further, a part of the circumferential surface of the mist collection portion 211 faces downward to collect the mist.

As described above, the mist on the mist collection portion 211 is washed with the cleaning liquid 25 and scraped off from the mist collection portion 211 by the blade 24 (i.e., the mist collection portion 211 is cleaned). As a result, the mist collection capability of the mist collection portion 211 can be maintained for a long period of time, and the mist collection portion 200 can be continuously used.

The connection portion 212 of the mist collector 21 is covered with the nonconductor 213, and the nonconductor 213 is bonded to the connection portion 212 via an adhesive. As a result, a gap between the connection portion 212 and the nonconductor 213 can be filled. Thus, the surface of the connection portion 212 can be entirely protected without a gap, and a short circuit caused by the cleaning liquid or mist adhering to the surface of the connection portion 212 can be prevented.

The mist collection portion 211 may be made of carbon. Due to such a configuration, as compared with the mist collection portion 211 formed of a metal material, rust caused by the cleaning liquid 25 adhering to the mist collection portion 211 can be prevented.

The blade 24 is preferably formed of a material having high insulating properties. In particular, the blade 24 is preferably formed of a rubber material. Such a blade 24 does not grind the conductive material of the mist collection portion 211 when the blade 24 cleans the mist collection portion 211.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

In the present disclosure, the liquid to be discharged is not limited to a particular liquid as long as the liquid has a viscosity or surface tension to be discharged from a head (liquid discharge head). However, preferably, the viscosity of the liquid is not greater than 30 millipascal-second (mPa·s) under ordinary temperature and ordinary pressure or by heating or cooling. Examples of the material to be discharged include a solution, a suspension, or an emulsion including, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

The term "liquid" includes not only ink but also paint, a pretreatment liquid, a binder, and an overcoat liquid.

In the present disclosure, the term "liquid discharge apparatus" includes a liquid discharge head and a mist collector, and drives the liquid discharge head to discharge liquid. The term "liquid discharge apparatus" used in the present disclosure includes, in addition to apparatuses to discharge liquid to a recording medium serving as a medium onto which liquid can adhere, apparatuses to discharge the liquid into gas (air) or liquid.

For example, the "liquid discharge apparatus" may further include devices relating to feeding, conveying, and ejecting of the medium onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers to form a three-dimensional object.

The "liquid discharge apparatus" is not limited to an apparatus that discharges liquid to visualize meaningful images such as characters or figures. For example, the discharge apparatus may be an apparatus that forms patterns having no meaning or an apparatus that fabricates three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the "medium onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any medium to which liquid adheres, unless otherwise specified.

Examples of materials of the "medium onto which liquid can adhere" include any materials to which liquid can adhere even temporarily, such as paper, thread, fiber, fabric, leather, metal, plastic, glass, wood, and ceramic.

The term "liquid discharge apparatus" may be an apparatus in which the liquid discharge head and the medium onto which liquid can adhere move relative to each other. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

The terms "image formation," "recording," "printing," "image printing," and "fabricating" used in the present disclosure may be used synonymously with each other.

Aspects of the present disclosure are, for example, as follows.

Aspect 1

A liquid discharge apparatus includes a liquid discharge head to discharge a liquid, a conductive mist collector to collect a mist, an electrode to apply a voltage to the mist collector, and a cleaning liquid to clean the mist collector. The mist collector has a connection portion connected to the electrode. The surface of the connection portion is covered with a nonconductor, and an adhesive is disposed between the connection portion and the nonconductor.

In other words, a liquid discharge apparatus includes a liquid discharge head, a mist collector, an electrode, and a cleaning liquid applier. The liquid discharge head discharges a liquid. The mist collector includes a mist collection portion and a connection portion. The mist collection portion is formed of a conductive material to collect a mist of the liquid on a surface of the mist collection portion. The connection portion is disposed at each end of the mist collection portion. The electrode is connected to the connection portion to apply a voltage to the mist collection portion through the connection portion. The cleaning liquid applier applies a cleaning liquid to the surface of the mist collection portion to remove the mist from the surface of the mist collection portion.

Aspect 2

In the liquid discharge apparatus according to Aspect 1, the mist collector includes a nonconductor bonded to the connection portion via an adhesive to cover the connection portion.

Aspect 3

In the liquid discharge apparatus according to Aspect 1 or 2, the mist collector is made of carbon.

In other words, the mist collector includes a part made of carbon.

Aspect 4

The liquid discharge apparatus according to Aspect 1 or 2, further includes a cleaner to contact the mist collector to clean a surface of the mist collector. The cleaning member is formed of an insulating material.

In other words, the liquid discharge apparatus according to Aspect 1 or 2, further includes a cleaner to contact the surface of the mist collection portion to remove the mist from the mist collection portion. The cleaner includes an electrical insulation material.

Aspect 5

In the liquid discharge apparatus according to Aspect 4, the cleaner is formed of a rubber material.

In other words, the cleaner includes a blade made of rubber.

Aspect 6

In the liquid discharge apparatus according to any one of Aspects 1 to 5, further includes multiple discharge heads including the liquid discharge head, a carriage, and a conveyor. The multiple discharge heads are arrayed in a first direction. The carriage mounts the multiple discharge heads and is movable in the first direction. The conveyor conveys a medium in a second direction orthogonal to the first direction. The mist collection portion is disposed inside the carriage and between the multiple discharge heads adjacent to each other in the first direction.

Aspect 7

The liquid discharge apparatus according to Aspect 6, further includes a blade to contact the surface of the mist collection portion to remove the mist from the mist collection portion. The mist collection portion is a rotator to rotate around the connection portion as a rotation axis. The blade is disposed between the multiple discharge heads adjacent to each other in the first direction and between one of the multiple discharge head and the mist collection portion, in the first direction.

Aspect 8

In the liquid discharge apparatus according to Aspect 7, a longitudinal direction of each of the mist collection portion and the blade is in the second direction.

Aspect 9

In the liquid discharge apparatus according to Aspect 6, the cleaning liquid applier is disposed in the carriage and above the mist collection portion.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:

a liquid discharge head configured to discharge a liquid;

a mist collector including a mist collection portion formed of a conductive material, the mist collection portion configured to collect a mist of the liquid on a surface of the mist collection portion, and a connection portion at each end of the mist collection portion;

an electrode connected to the connection portion, the electrode configured to apply a voltage to the mist collection portion through the connection portion; and a cleaning liquid applier configured to apply a cleaning liquid to the surface of the mist collection portion to remove the mist from the surface of the mist collection portion, wherein the mist collector includes a nonconductor that is bonded to the connection portion via an adhesive and that covers the connection portion.

2. The liquid discharge apparatus according to claim 1, wherein the mist collector includes a part made of carbon.

3. The liquid discharge apparatus according to claim 1, further comprising a cleaner configured to contact the surface of the mist collection portion to remove the mist from the mist collection portion, wherein the cleaner includes an electrically insulating material.

4. The liquid discharge apparatus according to claim 3, wherein the cleaner includes a blade made of rubber.

5. The liquid discharge apparatus according to claim 1, further comprising:

multiple discharge heads including the liquid discharge head, the multiple discharge heads arrayed in a first direction;

a carriage on which the multiple discharge heads are mounted, the carriage being movable in the first direction;

a conveyor configured to convey a medium in a second direction orthogonal to the first direction; and a plurality of mist collectors, wherein the plurality of mist collectors are disposed inside the carriage, and respectively between pairs of the multiple discharge heads adjacent to each other in the first direction.

6. The liquid discharge apparatus according to claim 5, further comprising a plurality of blades configured to respectively contact the surface of the mist collection portion of the plurality of mist collectors to remove the mist from the mist collection portion, wherein the mist collection portion is a rotator configured to rotate around the connection portion as a rotation axis, and the plurality of blades are respectively disposed between the multiple discharge heads adjacent to each other in the first direction, and between a discharge head from among the multiple discharge heads and the mist collection portion of a corresponding one of the plurality of mist collectors in the first direction.

7. The liquid discharge apparatus according to claim 6, wherein a longitudinal direction of each of the mist collection portion and the plurality of blades is in the second direction.

8. The liquid discharge apparatus according to claim 5, wherein the cleaning liquid applier is disposed in the carriage and above the mist collection portion.

* * * * *